UNITED STATES PATENT OFFICE.

CLINTON ELLIOTT, OF NEW YORK, N. Y.

PROCESS OF COATING CANDIES.

1,406,628. Specification of Letters Patent. Patented Feb. 14, 1922.

No Drawing. Application filed November 22, 1919. Serial No. 339,995.

*To all whom it may concern:*

Be it known that I, CLINTON ELLIOTT, a citizen of the United States, and a resident of New York, in the county and State of New York, have invented an Improvement in Processes of Coating Candies, of which the following is a specification.

This invention relates to a process of coating candies and in its more specific aspects it relates to a means of coating so called hard candies with a coherent covering to protect them from atmospheric influences. These hard candies, sometimes referred to as fruit tablets, are made of cane sugar and are usually in the form of tablets or small balls, hard and more or less transparent. In warm weather the candies are apt to soften and stick together and when exposed to the air the candy tends to grain, losing its transparent color and becoming crumbly. The present process aims to provide a suitable covering which will not only prevent the candies from adhering to each other because of humidity but which will exclude air therefrom and prevent them from graining.

In order that my invention may be understood I will describe in detail a practical example of the process giving figures and temperatures by way of example for purposes of definiteness and not because the particular values set forth are necessarily essential.

In carrying out the process practically I have treated about 150 lbs. of hard candies at a time. The hard candies are first suitably agitated with dry sugar, preferably pulverized or confectionery sugar. This may conveniently be accomplished by placing the candy and sugar in a revolving pan which may be cylindrical in shape and inclined at an angle. This pan may be heated to about 130° F. and revolved for 15 or 20 minutes, thus rolling about the pieces of candy in sugar and agitating them and causing the sugar to be spread over the candy to which it adheres the more readily because of its finely pulverized condition.

After the candy has been thoroughly agitated with the sugar there is then added gradually about 50 lbs. of plain sugar syrup made by boiling granulated sugar to 245°. This syrup is poured in gradually at the rate of about a gill or half a pint at a time and the pan kept revolving at an elevated temperature until the syrup is dried or set on the candies and forms a coating thereon. The coating provided by this process is homogenous and concrete, does not become sticky on account of humidity as do the candies themselves and completely excludes the air from the candies. Candies prepared according to the specific receipe just given will have a coating of a thickness of from $\frac{1}{16}$ of an inch to $\frac{1}{24}$.

The order of the steps set forth is of importance. If syrup were added directly to hard candies it would coalesce therewith and simply form more hard candy. Coating candies with dry sugar is known and while this to an extent prevents adherence it does not form a uniform air-excluding coating. In the present instance it appears that either the gradually added syrup fluxes the sugar into a coating over the candy or else that the dry sugar forms a protecting covering which prevents the gradually added syrup from becoming a part of the candy centers themselves and causes it to harden as a coherent protecting coating enclosing the candy centers.

Having thus described a specific form of my invention by way of illustration, the principles exemplified thereby which I claim as new and desire to secure by Letters Patent I shall express in the following claims.

Claims:

1. A method of coating candies which comprises agitating them with sugar and then gradually adding hot syrup and continuing the agitation.

2. A method of coating candies which comprises first coating them with dry sugar and then gradually adding syrup, permitting the same to set on the candies to provide a coherent substantially uniform coating.

In testimony whereof I have signed my name to this specification.

CLINTON ELLIOTT.